US010852143B2

(12) United States Patent
Seth

(10) Patent No.: US 10,852,143 B2
(45) Date of Patent: Dec. 1, 2020

(54) MOTION SENSOR WITH DRIFT CORRECTION

(71) Applicant: Rohit Seth, Ontario (CA)

(72) Inventor: Rohit Seth, Ontario (CA)

( * ) Notice: Subject to any disclaimer, the term of this patent is extended or adjusted under 35 U.S.C. 154(b) by 0 days.

(21) Appl. No.: 16/453,961

(22) Filed: Jun. 26, 2019

(65) Prior Publication Data

US 2020/0011669 A1 Jan. 9, 2020

Related U.S. Application Data

(60) Provisional application No. 62/690,865, filed on Jun. 27, 2018.

(51) Int. Cl.
*G01C 21/16* (2006.01)
*G01C 25/00* (2006.01)
*G01C 19/00* (2013.01)
*G01P 13/00* (2006.01)

(52) U.S. Cl.
CPC .......... *G01C 21/165* (2013.01); *G01C 19/00* (2013.01); *G01C 25/005* (2013.01); *G01P 13/00* (2013.01)

(58) Field of Classification Search
CPC ........ G01C 25/005; G01C 21/16; G01P 21/00
See application file for complete search history.

(56) References Cited

U.S. PATENT DOCUMENTS 9,222,989 B2 12/2015 Hesen et al.
9,417,693 B2 8/2016 Seth
9,846,482 B2 12/2017 Seth (Continued)

FOREIGN PATENT DOCUMENTS

JP 2000-132305 A 5/2000
JP 2001-340307 A 12/2001
(Continued)

OTHER PUBLICATIONS

Seth, Rohit, Communication Pursuant to Rules 161(2) and 162, EP15867651-0, dated Jul. 28, 2017, 2 pgs.

(Continued)

*Primary Examiner* — Ryan Rink
(74) *Attorney, Agent, or Firm* — Morgan, Lewis & Bockius LLP

(57) ABSTRACT

Systems and/or devices for implementing a tracking device for tracking a position/location and orientation of an object are provided herein. The device comprises one or more sides that define a predetermined shape, and a plurality of inertial measurement units (IMU) mounted to the one or more sides of the predetermined shape. Each IMU is configured to detect movement of the object and generate inertial output data representing a position and/or orientation of the object. Each IMU includes a first sub-sensor and a second sub-sensor. Each IMU is positioned at a predetermined distance and orientation relative to a center point of the tracking device. The device also comprises a controller communicatively coupled to the plurality of IMUs, the controller configured to receive output data from each of the plurality of IMUs, and determine position/location and orientation of the object based on the received output data from the plurality of IMUs and known data points for the predetermined shape to eliminate drift from sensor data.

23 Claims, 7 Drawing Sheets

(56) References Cited

U.S. PATENT DOCUMENTS

| | | |
|---|---|---|
| 10,025,891 B1 * | 7/2018 | Zaki ................... G01P 21/00 |
| 10,527,425 B1 * | 1/2020 | Jankowski ............ G01C 21/16 |
| 2002/0152077 A1 | 10/2002 | Patterson |
| 2003/0187623 A1 * | 10/2003 | Bayard ................. G01C 21/16 702/190 |
| 2011/0257927 A1 | 10/2011 | Bharadwaj et al. |
| 2012/0203487 A1 * | 8/2012 | Johnson ............... G01C 25/005 702/104 |
| 2014/0132410 A1 | 5/2014 | Chang |
| 2014/0240103 A1 | 8/2014 | Lake et al. |
| 2014/0243671 A1 * | 8/2014 | Holl ..................... A61B 8/4209 600/443 |
| 2014/0267024 A1 | 9/2014 | Keller et al. |
| 2014/0275824 A1 | 9/2014 | Couse |
| 2015/0242112 A1 | 8/2015 | Bielitz et al. |
| 2015/0304634 A1 | 10/2015 | Kavounis |
| 2017/0086004 A1 | 3/2017 | Downing et al. |
| 2018/0059204 A1 | 3/2018 | Mafouz |
| 2019/0186920 A1 * | 6/2019 | Leach .................... G01C 21/30 |

FOREIGN PATENT DOCUMENTS

| | | |
|---|---|---|
| JP | 2005-173419 A | 6/2005 |
| JP | 2013-242226 A | 12/2013 |
| WO | WO 2011/064677 A2 | 6/2011 |

OTHER PUBLICATIONS

Seth, Rohit, Extended European Search Report, EP15867651-0, dated May 18, 2018, 7 pgs.

Seth, Rohit, Communication Pursuant to Rules 70(2) and 70a(2), EP15867651-0, dated Jun. 6, 2018, 1 pg.

Seth, Rohit, Notification of First Office Action, CN201580024286.X, dated Mar. 5, 2018, 13 pgs.

Seth, Rohit, Notification of Reasons for Rejection, JP2017-531771, dated Jan. 17, 2019, 11 pgs.

Seth, Office Action, U.S. Appl. No. 15/237,587, dated Dec. 30, 2016, 7 pgs.

Seth, Final Office Action, U.S. Appl. No. 15/237,587, dated May 1, 2017, 8 pgs.

Seth, Notice of Allowance, U.S. Appl. No. 15/237,587, dated Aug. 11, 2017, 5 pgs.

Seth, Office Action, U.S. Appl. No. 15/837,927, dated Jan. 23, 2018, 5 pgs.

Seth, Notice of Allowance, U.S. Appl. No. 15/837,927, dated Sep. 4, 2018, 10 pgs.

Seth, Notice of Allowance, U.S. Appl. No. 15/837,927, dated Feb. 6, 2019, 5 pgs.

Seth, Notice of Allowance, U.S. Appl. No. 16/248,700, dated Mar. 20, 2019, 11 pgs.

Seth, International Search Report and Written Opinion, PCT/CA2019/050897, dated Sep. 27, 2019, 7 pgs.

* cited by examiner

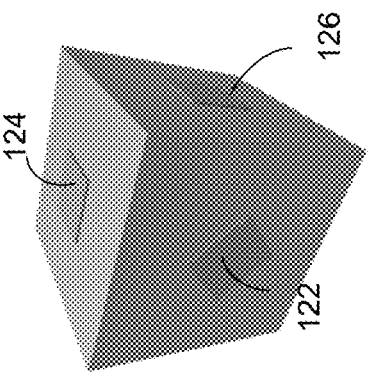
Figure 1E
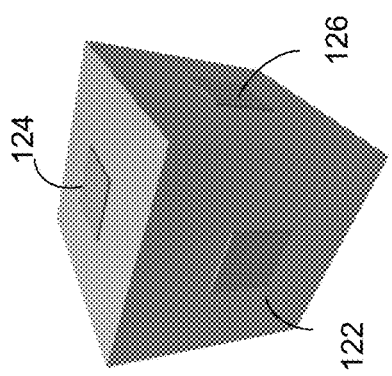
Figure 1F
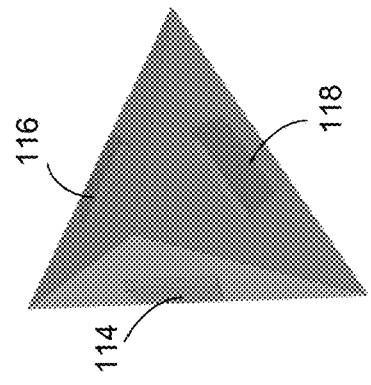
Figure 1C
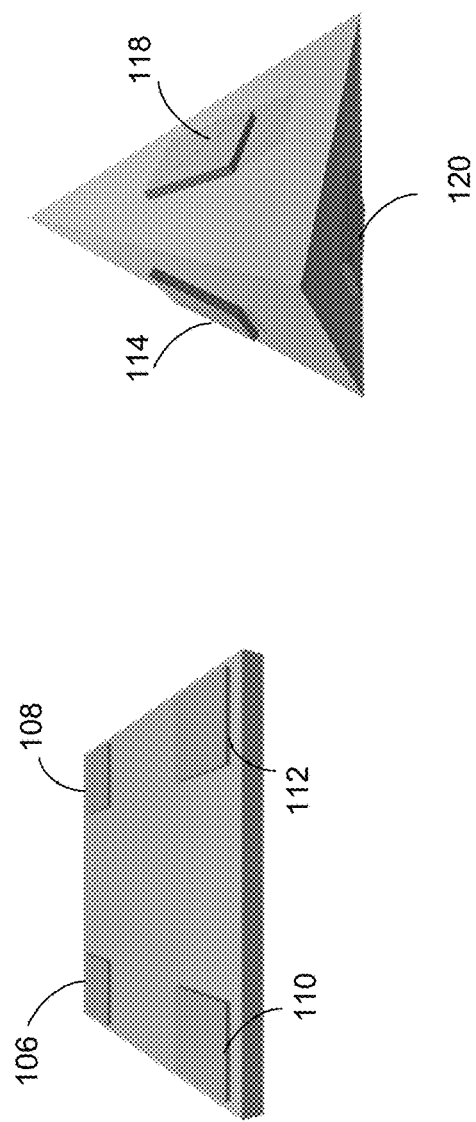
Figure 1D
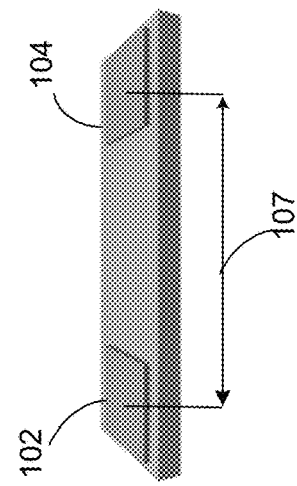
Figure 1A
Figure 1B

MOTION SENSOR WITH DRIFT CORRECTION

CROSS-REFERENCE TO RELATED APPLICATIONS

This application claims the benefit of U.S. Provisional Patent Application No. 62/690,865 filed on Jun. 27, 2018 entitled "Motion Sensor with Drift Correction", which is incorporated by reference herein in its entirety. This application is also related to U.S. Pat. No. 9,417,693, entitled "Wearable Wireless HMI Device" and filed on Dec. 8, 2015; U.S. Pat. No. 9,846,482, entitled "Wearable Wireless HMI Device" and filed on Aug. 15, 2016; and U.S. Patent Application Publication No. 2018/0101231, entitled "Wearable Wireless HMI Device" and filed on Dec. 11, 2017. The entire contents of these references are incorporated by reference in their entireties.

TECHNICAL FIELD

The disclosed implementations relate generally to motion sensors and more specifically to a method, system, and device for implementing motions sensors with drift correction, in some implementations, capable of position tracking, more accurate than the Global Positioning System (GPS), and independent of external reference markers, transponders, or satellites.

BACKGROUND

Motion tracking detects the precise position and location of an object by recognizing rotation (pitch, yaw, and roll) and translational movements of the object. Inertial tracking is a type of motion tracking that uses data from sensors (e.g., accelerometers, gyroscopes, magnetometers, altimeters, and pressure sensors) mounted on an object to measure positional changes of the object. Some of the sensors are inertial sensors that rely on dead reckoning to operate. Dead reckoning is the process of calculating an object's current location by using a previously determined position, and advancing that position based upon known or estimated accelerations, speeds, or displacements over elapsed time and course. While dead reckoning techniques are somewhat effective, they are subject to cumulative error called "drift." Because some IMUs estimate relative position/location by integrating acceleration data twice from an accelerometer, even a small error in acceleration results in compounded, increasing, error in relative position/location that accumulates over time. Similarly, errors in gyroscopic angular velocity data lead to cumulative error in relative angular orientation. Thus, acceleration and gyroscopic data are unreliable, when used in isolation, to estimate orientation and positional changes of an object being tracked using IMUs.

Traditional solutions that compensate for drift without eliminating it, are too costly and/or unreliable. One such solution merges external reference data, such as from a camera or a GPS, with the data from an IMU mounted on an object being tracked to reset the drift of the IMU data at defined intervals. Fusing IMU data with a GPS signal typically results in a large error margin (e.g., several meters). Other solutions fuse data from multiple IMUs, using a Kalman filter, and weighted averaging to try and reduce orientation-drift using statistical calculations over a large sample or number of IMU sensors with differential measurement techniques. When multiple sensors are used, even if a few of the sensors are obstructed, orientation tracking becomes increasingly unreliable. Location tracking remains unsolved even with the best, current drift-compensation techniques employing multiple sensors with weighted statistical calculations. Furthermore, a very large number of sensors is required to significantly reduce overall drift in a multi-sensor system. More sensors also mean higher cost, greater combined power consumption, and increased latency in sampling and processing of orientation data. Increased latency causes low sampling rates further leading to positional error and a reduction in positional accuracy.

SUMMARY

Accordingly, there is a need for systems and/or devices for implementing cost-effective, high accuracy, high-speed motion sensors that correct for drift.

(A1) In one aspect, some implementations include a tracking device for tracking location and orientation of an object. The device comprises one or more sides that form a predetermined shape. The device also comprises a plurality of inertial measurement units (IMU) mounted to the one or more sides of the predetermined shape. Each IMU is configured to detect movement of the object and generate inertial output data representing non-linear acceleration and/ or angular velocity of the object. Each IMU includes a first sub-sensor and a second sub-sensor. Each IMU is positioned at a predetermined distance and orientation relative to each other and a center of mass of the tracking device. The device also comprises a controller communicatively coupled to the plurality of IMUs, the controller configured to perform a sequence of steps. The sequence of steps comprises receiving first sub-sensor inertial output data and second sub-sensor inertial output data from each of the plurality of IMUs. The sequence of steps also comprises for each IMU: generating calibrated inertial output data based on the first sub-sensor inertial output data and the second sub-sensor inertial output data; and, cross-correlating the first sub-sensor inertial output data with the second sub-sensor inertial output data to identify and remove anomalies from the first sub-sensor inertial output data with the second sub-sensor inertial output data to generate decomposed inertial output data. The sequence of steps also comprises determining the translational and rotational state of the tracking device based on the decomposed inertial output data from each of the IMUs. The sequence of steps also comprises synthesizing first sub-sensor inertial output data and second sub-sensor inertial output data to create IMU synthesized or computed data using a synthesizing methodology based on the translational and rotational state of the tracking device. The sequence of steps also comprises calculating a current tracking device rectified data output (also referred to herein as "drift-free or "drift-corrected") based on the synthesized movement of each of the IMUs, a predetermined position of each of the IMUs and a predetermined orientation of each of the IMUs. The sequence of steps also comprises calculating a current location and orientation of an object based on a difference between the current object rectified data output, and a previous object drift-free or rectified data output.

(A2) In some implementations of the tracking device of A1, wherein generating calibrated inertial output data includes applying neural network weights to the first sub-sensor inertial output data and the second sub-sensor inertial output data, wherein the neural network weights are adjusted at a learning rate based on the positional state of the tracking device, calculating a discrepancy value representative of a difference between an actual movement of the object and estimated movement of the object, and removing the discrepancy value from the calibrated inertial output data.

(A3) In some implementations of the tracking device of A2, the neural network weights applied to the first sub-sensor inertial output data and the second inertial output data are based on historical inertial output data from each of the first and second sub-sensors.

(A4) In some implementations of the tracking device of A1, the decomposed inertial output data corresponding to the first sub-sensor is calibrated based on the second sub-sensor inertial output data by providing feedback to dynamic-calibration neural network of first sub-sensor.

(A5) In some implementations of the tracking device of A1, cross-correlating the first sub-sensor inertial output data with the second sub-sensor inertial output data includes applying pattern recognition to the second sub-sensor inertial output data to generate a decomposed inertial output data representative of the first sub-sensor inertial output data.

(A6) In some implementations of the tracking device of A1, the first sub-sensor inertial output data and second sub-sensor inertial output data are filtered to minimize signal noise through signal conditioning.

(A7) In some implementations of the tracking device of A1, the first sub-sensor inertial output data and second sub-sensor inertial output data from each of the plurality of IMUs is received periodically at less than approximately 1 millisecond (ms) for continuous high sampling rate.

(A8) In some implementations of the tracking device of A1, the first sub-sensor and the second sub-sensor are each one of: accelerometer, magnetometer, gyroscope, altimeter, and pressure sensor; wherein the first sub-sensor is a different sensor type than the second sub-sensor.

(A9) In some implementations of the tracking device of A1, the predetermined shape is one of: a plane, a tetrahedron, a cube, or any platonic solid, or any other irregular configurations with known distances and angels between IMUs.

(A10) In some implementations of the tracking device of A1, at least some of the IMUs used to calculate the rectified IMU data output are oriented at different angles along two different axes relative to each other.

(A11) In some implementations of the tracking device of A1, calculating the current position and orientation of the object based on the difference between the current rectified IMU output and the previous object rectified IMU output include: identifying an edge condition; and blending the current object rectified IMU output and the previous object rectified IMU output to remove the edge condition using neural networks (A12) In another aspect, some implementations include a method of tracking the location and orientation of an object using a tracking device. The tracking device includes one or more sides that define a predetermined shape. The tracking device also includes a plurality of inertial measurement units (IMU) mounted to the one or more sides of the predetermined shape. Each IMU includes a first sub-sensor and a second sub-sensor. Each IMU is positioned at a predetermined distance and orientation relative to each other and a center of mass of the tracking device. The tracking device also includes a controller communicatively coupled to the plurality of IMUs. The method comprises performing a sequence of steps. The sequence of steps includes, at each IMU, detecting movement of the object and generating inertial output data representing acceleration and/or angular velocity of the object. The sequence of steps also includes, at the controller, receiving first sub-sensor inertial output data and second sub-sensor inertial output data from each of the plurality of IMUs. The sequence of steps also includes, at the controller, for each IMU: generating calibrated inertial output data based on the first sub-sensor inertial output data and the second sub-sensor inertial output data; cross-correlating the first sub-sensor inertial output data with the second sub-sensor inertial output data to identify and remove anomalies from the first sub-sensor inertial output data with the second sub-sensor inertial output data to generate decomposed inertial output data. The sequence of steps also includes, at the controller, determining a translational and rotational state of the tracking device based on the decomposed inertial output data from each of the IMUs. The sequence of steps also includes, at the controller, synthesizing first sub-sensor inertial output data and second sub-sensor inertial output data to create IMU synthesized or computed data using a synthesizing methodology based on the positional and rotational state of the tracking device. The sequence of steps also includes, at the controller, calculating a current tracking device overall drift-free or rectified data output based on the synthesized movement of each of the IMUs, a predetermined location of each of the IMUs and a predetermined orientation of each of the IMUs. The sequence of steps also includes, at the controller, calculating a current location and orientation of an object based on a difference between the current object overall rectified data and a previous object overall rectified data.

(A13) In some implementations of the method of (A12), wherein generating calibrated inertial output data includes applying neural network weights to the first sub-sensor inertial output data and the second sub-sensor inertial output data, wherein the neural network weights are adjusted at a learning rate based on the positional state of the tracking device, calculating a discrepancy value representative of a difference between an actual movement of the object and estimated movement of the object, and removing the discrepancy value from the calibrated inertial output data.

(A14) In some implementations of the method of (A13), the neural network weights applied to the first sub-sensor inertial output data and the second inertial output data are based on historical inertial output data from each of the first and second sub-sensors.

(A15) In some implementations of the method of (A12), the decomposed inertial output data corresponding to the first sub-sensor is calibrated based on the second sub-sensor inertial output data by providing feedback to dynamic-calibration neural network of first sub-sensor.

(A16) In some implementations of the method of (A12), cross-correlating the first sub-sensor inertial output data with the second sub-sensor inertial output data includes applying pattern recognition to the second sub-sensor inertial output data to generate a decomposed inertial output data representative of the first sub-sensor inertial output data.

(A17) In some implementations of the method of (A12), the first sub-sensor inertial output data and the second sub-sensor inertial output data are filtered to minimize signal noise through signal conditioning.

(A18) In some implementations of the method of (A12), the first sub-sensor inertial output data and second sub-sensor inertial output data from each of the plurality of IMUs is received periodically at less than approximately 1 ms for continuous high sampling rate.

(A19) In some implementations of the method of (A12), the first sub-sensor and the second sub-sensor are each one of: accelerometer, magnetometer, gyroscope, altimeter, and pressure sensor and the first sub-sensor is a different sensor type than the second sub-sensor.

(A20) In some implementations of the method of (A12), the predetermined shape is one of: a plane, a tetrahedron, a cube or any platonic solid, or any other irregular configurations with known distances and angels between IMUs.

(A21) In some implementations of the method of (A12), at least some of the IMUs used to calculate the overall drift-free or rectified system output are oriented at different angles along two different axes relative to each other.

(A22) In some implementations of the method of (A12), calculating the current location and orientation of the object based on the difference between the current object rectified data and the previous object rectified data output include: identifying an edge condition; and blending the current object rectified data output and the previous object rectified data output to remove the edge condition using neural networks.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 1A-1F illustrate various configurations of motion sensors mounted on two-dimensional ("2-D") or three-dimensional ("3-D") objects, in accordance with some implementations.

DESCRIPTION OF IMPLEMENTATIONS

Figure 2:
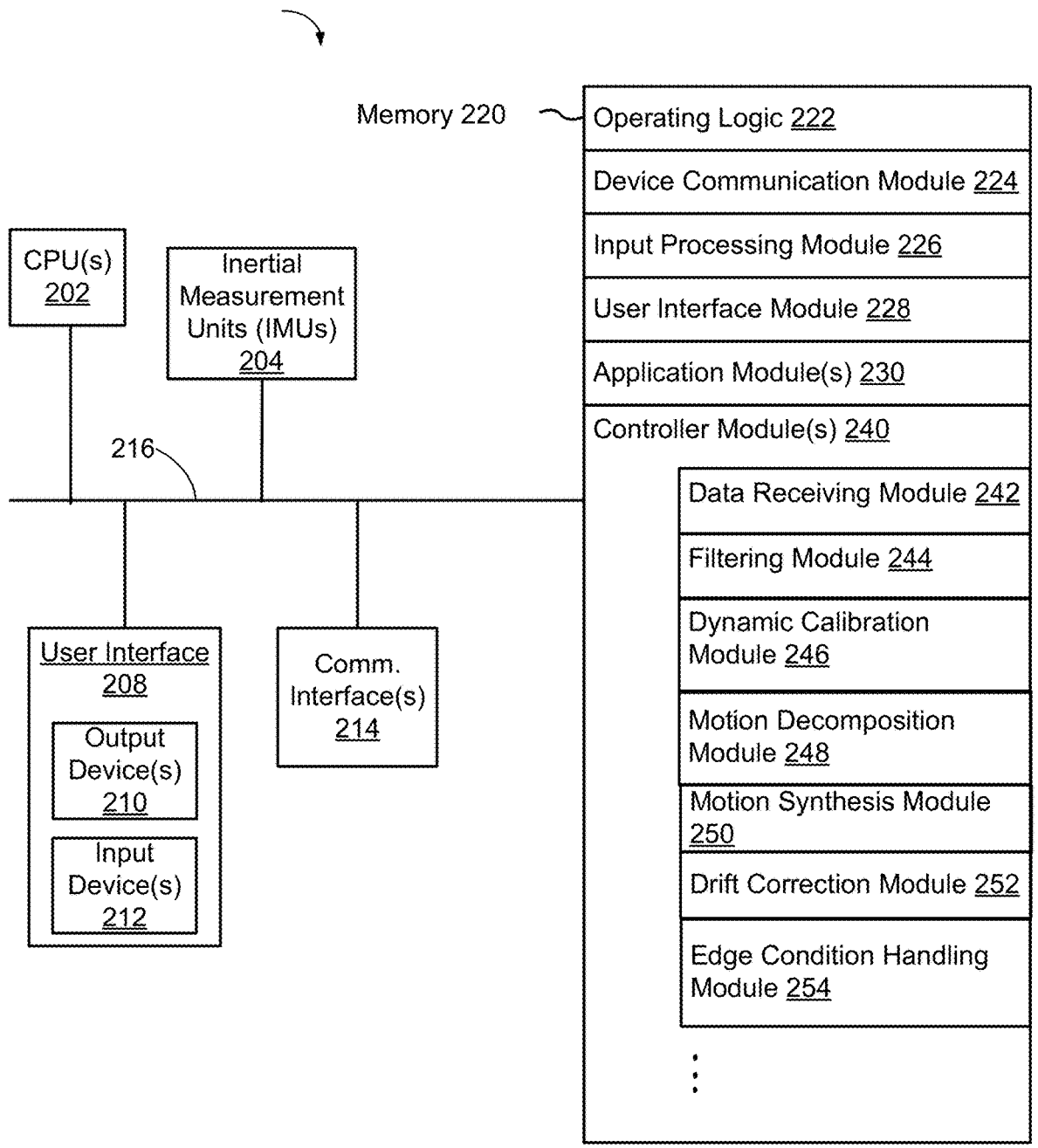
FIG. 2 is a block diagram illustrating a representative system with sensor(s) with drift correction, according to some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Described herein are exemplary implementations for systems, methods and/or devices for implementing cost-effective, high accuracy, high-speed motion sensors that correct for drift. There are a number of different applications for motion sensors that correct for drift, including, but not limited to, gaming systems, smartphones, helmet-mounted displays, military applications, and gesture tracking devices, among others. For example, in U.S. Pat. No. 9,417,693 (the "'693 Patent"), incorporated herein by reference in its entirety, different implementations for a wearable wireless human-machine interface (HMI) are described. In the '693 Patent, a user can control a controllable device based on gestures performed by the user using the wearable HMI. In some implementations, a controller to track motion and correct for drift, as described herein, may be connected to the IMUs of the wearable HMI. In some implementations, the controller is attached to or integrated in the wearable HMI. In some implementations, the controller is remote from the wearable HMI but communicatively coupled to the wearable HMI.

FIGS. 1A-1F illustrate various configurations of motion sensors mounted on 3D objects, in accordance with some implementations. Motion sensors may be mounted in linear arrays, on planar surfaces, or vertices of a myriad of geometric configurations, formed by any dimensional planar surface, platonic solid, or irregular 3D object. As long as the distances and angles are known between the mounted motion sensors, drift can be eliminated by, among certain methods or portions thereof described herein, resetting the motion sensors' instantaneous measured acceleration, angular velocity, magnetic orientation, and altitude to match the known geometry formed by the physical distances and angles of the motion sensors relative to each other, as further described below in reference to flowcharts 4A-4D below.

In a linear geometry, as shown in FIG. 1A, two sensors 102, 104 are positioned adjacent to each other at a fixed distance 107, and the angles between the two sensors can be considered to be approximately 0 degrees or approximately 180 degrees. As the measured distance or angle between the two fixed sensors 102 and 104, at any given instantaneous reading, deviates from the known distance 107, or angle between them, this drift can be removed and positions of the two motion sensors can be reset to a fairly accurate degree.

A planar configuration of three (3) or four (4) or more sensors can provide a spatial calculation based on a higher number of IMU readings of instantaneous measurements of all sensors in the array with known physical angles and distances between them. FIG. 1B shows a four-sensor configuration with sensors 106, 108, 110, and 112 mounted adjacent to each other in a planar configuration. Planar configurations, such as the configurations shown in FIGS. 1A and 1B, provide a simpler mathematical model with fairly low demand for computation. However, variations in axial motion detection methods of the physical sensors may affect the accuracy of measurement in different axes of motion and orientation. For example, motion in the Z-axis of a MEMS-based sensor is heavily biased with a gravity vector which may introduce higher variance in the physical motion of the sensor in this axis. Additionally, the coriolis force, used to calculate Yaw in the z-axis, is also susceptible to larger variance than the X, or Y axis.

For improved drift correction, a tetrahedron configuration with four (4) sensors, each one mounted on each face of the tetrahedron can provide a blend of multi-axial data resulting in better complementary and compensatory measurement for the gravity vector bias than a single, Z-Axis of all sensors, according to some implementations. FIGS. 1C and 1D show one such configuration. FIG. 1C shows the top—oblique view of a tetrahedron with motion sensors 114, 116, 118 mounted on each of the visible three faces. FIG. 1D shows the bottom—oblique view of the tetrahedron shown in FIG. 1C showing the additional sensor 120 on the fourth face of the tetrahedron. In this configuration, a component of the X and Y axis is also exposed to the gravity vector from at least three sensors at any given time, permitting a higher degree of accuracy through the removal of the gravity vector from a number of sensors and a number of axes at any instantaneous measurement. Sensors are mounted at angles on each surface, providing a blend of X, Y, and Z axis data for better spatial calculations and drift correction, in accordance with some implementations.

Furthermore, a cubic configuration will provide a higher sensor count of six (6) sensors on the six (6) surfaces of the cube to stabilize the spatial deviation even further. FIG. 1E shows an oblique view of a cubic configuration, according to some implementations. Only three out of the six faces are visible in FIG. 1E. Each of the six faces may have a sensor mounted, including the sensors 122, 124, and 126. In some implementations, some, less than all, faces of any object described herein have at least one sensor. In this configuration, each sensor on each face enables a complementary reading between the other sensors on the other faces of the cube. However, as the number of sensors is increased, the latency to read all measurements is also increased in the cubic or higher dimensional solid geometries.

Motion sensors can also be rotated on opposite faces of the geometric solids to provide an axial blend in any configuration, according to some implementations. FIG. 1F shows an oblique view of another configuration of the cuboid in FIG. 1E wherein motion sensors are mounted on each face of the cube as before, but sensors may be rotated at an angle between zero (0) and ninety (90) degrees, non-inclusive. For example, sensor 122 may be rotated at an angle of approximately forty-five (45) degrees with respect to the other sensors. Although this method may provide a better analysis of instantaneous motion data, the computation time per measurement-to-calculation output may be longer.

FIG. 2 is a block diagram illustrating a representative system 200 with drift-free sensor(s), according to some implementations. In some implementations, the system 200 includes one or more processing units (e.g., CPUs, ASICs, FPGAs, microprocessors, and the like) 202, one or more communication interfaces 214, memory 220, and one or more communication buses 216 for interconnecting these components (sometimes called a chipset). The type of processing units 202 is chosen to match the requirement of application, including power requirements, according to some implementations. For example, the speed of the CPU should be sufficient to match application throughput.

In some implementations, the system 200 includes a user interface 208. In some implementations, the user interface 208 includes one or more output devices 210 that enable presentation of media content, including one or more speakers and/or one or more visual displays. In some implementations, user interface 208 also includes one or more input devices 212, including user interface components that facilitate user input such as a keyboard, a mouse, a voice-command input unit or microphone, a touch screen display, a touch-sensitive input pad, a gesture capturing device, or other input buttons or controls. Furthermore, some systems use a microphone and voice recognition or a camera and gesture recognition or a motion device and gesture recognition to supplement or replace the keyboard.

In some implementations, the system 200 includes one or more Inertial Measurement Unit(s) 204. In some implementations, the IMUs include one or more accelerometers, one or more magnetometers, and/or one or more gyroscopes, and/or altimeters, and/or pressure sensors. In some implementations, the one or more IMUs are mounted on an object that incorporates the system 200 according to a predetermined shape. FIGS. 1A-1F described above illustrate various exemplary configurations of motion sensors. In some implementations, the initial configuration of the IMUs (e.g., the number of IMUs, the predetermined shape) is also determined based on characteristics of the individual IMUs. For example, the orientation or the axis of the IMUs, and therefore the predetermined shape, are chosen so as to compensate for manufacturing defects. In some implementations, the one or more IMUs are fabricated as CMOS and MEMS system on a chip (SOC) that incorporates the system 200.

Communication interfaces 214 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 220 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, one or more EPROMs, one or more EEPROMs, or one or more other non-volatile solid state storage devices. Memory 220, or alternatively the non-volatile memory within memory 220, includes a non-transitory computer readable storage medium. In some implementations, memory 220, or the non-transitory computer readable storage medium of memory 220, stores the following programs, modules, and data structures, or a subset or superset thereof:

operating logic 222 including procedures for handling various basic system services and for performing hardware dependent tasks;

device communication module 224 for connecting to and communicating with other network devices (e.g., network interface, such as a router that provides Internet connectivity, networked storage devices, network routing devices, server system, etc.) connected to one or more networks via one or more communication interfaces 214 (wired or wireless);

input processing module 226 for detecting one or more user inputs or interactions from the one or more input devices 212 and interpreting the detected inputs or interactions;

user interface module 228 for providing and displaying a user interface in which settings, captured data, and/or other data for one or more devices (not shown) can be configured and/or viewed;

one or more application modules 230 for execution by the system 200 for controlling devices, and for reviewing data captured by devices (e.g., device status and settings, captured data, or other information regarding the system 200 and/or other client/electronic devices);

one or more controller modules 240, which provides functionalities for processing data from the one or more IMUs 204, including but not limited to:

data receiving module 242 for receiving data from the one or more IMUs 204 that is to be processed by the controller module(s) 240;

filtering module 244 for removing noise from the raw data received by the data receiving module 242;

dynamic calibration module 246 for cross-correlating the data between the one or more IMUs 204 (e.g., different gyroscopes and accelerometers of the one or more IMUs 204) to calibrate filtered data for the one or more IMUs 204;

motion decomposition module 248 that determines positional and rotational state based on the decomposed output for each of the one or more IMUs;

motion synthesis module 250 for synthesizing motion based on the output of the dynamic calibration module 246 and the motion decomposition module 248;

drift correction module 252 for correcting drift in the sensor output (e.g., using an Adaptive Continuous Fuzzy Rule (without modus ponens) Bayesian Filter with Trapazoidal Motion Parameters (ACFBT) for the predetermined shape based on the output from the motion synthesis module 248; and edge condition handling module 254 that handles complex movements based on the output (e.g., using Artificial Intelligence/Neural Networks/Deep Learning) of the drift correction module 252.

In some implementations, the raw data received by the data receiving module 242 from the IMUs include acceleration information from accelerometers, angular velocities from gyroscopes, degrees of rotation of magnetic field from magnetometers, atmospheric pressure from Altimeters, and differential Pressure Sensors. The raw data is received from each of the IMUs sequentially, according to some implementations. In some implementations, the IMU data is received in parallel.

In some implementations, the filtering module 244 filters the raw data to remove noise from the raw data signals received by the data receiving module 242. The filtering module 244 uses standard signal processing techniques (e.g., low-pass filtering, clipping, etc.) to filter the raw data thereby minimizing noise in sensor data, according to some implementations. The filtering module 244 also computes moving averages and moving variances using historical data from the sensors, according to some implementations.

In some implementations, the dynamic calibration module 246 uses an Artificial Intelligence (AI) framework (e.g., a neural network framework) to calibrate data from the one or more IMUs 204. For example, one or more "neurons" (typically 3 per sensor) are configured in a neural network configuration to calibrate the filtered data for the one or more IMUs 204. To understand how dynamic calibration works, consider first a static configuration for an object. Let us assume further that the shape of the object (sometimes herein called a predetermined shape) is a cuboid for the sake of explanation. A cuboid-shaped object could be placed on a planar surface six different ways (i.e., on six different faces of the cuboid). So there are six orientations to calibrate on. In this static configuration, the system 200 collects a large number of samples (e.g., approximately 1,000 or more samples) for each of the six orientations. This sampled data is collected and stored in memory 220. Later, when raw data is received, the stored sampled data is used as a baseline to correct any offset error in the raw data during sedentary states (i.e., when the object is not moving). In some implementations that use a neural network, the weights of the network are constantly tuned or adjusted based on the received raw data from the IMUs after offsetting the stored sampled data, according to some implementations. A neural network-based solution provides better estimates than a least squares regression analysis or statistical measures. As an example of how the neural network weights are adjusted dynamically, consider when the object is stationary but the neural network output indicates that the object is moving. The weights are readjusted, through back propagation, such that the output will indicate that the object is stationary. Thus the weights settle during times when the object is stationary. In some implementations, the learning rate of the neural network is maximized during sedentary states (sometimes herein called stationary states), and minimized when the object is in motion. Pattern recognition is used to detect whether the object is moving or is stationary so that the learning rate can be adjusted, according to some implementations. The different stationary and mobile states are used to adjust the weights affecting the accelerometer. In some implementations, known reference to the magnetic north is used to constantly adjust the weights that correspond to the magnetometers. In some implementations, the magnetometer data is also used to correct or settle the weights for the accelerometers when the object is moving because the reference point for the magnetic north and gravity vector are always known. Gyroscope data is more reliable than data from accelerometers because it only requires a single level integration. So the gyroscope data is also used to correct accelerometer weights, according to some implementations. It is noted, in some implementations, that the dynamic calibration module 246 is optional, and a pass-through channel passes the output of the filtering module 244 to the motion synthesis module 250 without dynamic calibration.

In some implementations, the motion decomposition module 248 uses pattern recognition techniques to eliminate anomalies due to cross-interaction or interference between the sub-sensors, in each IMU. Experimental data is collected for controlled translational and rotational movements of an object. For example, the behavior of the gyroscope is tracked under constant velocity and the pattern is stored in memory. When the gyroscopic data follows the known pattern, the fact that the object is under constant velocity is deduced based on this pattern. Similarly, accelerometer data (e.g., constant gravity vector) can be used to identify patterns to correct errors in gyroscopic data and/or magnetometer data, and magnetometer data can be used to identify patterns to correct errors in accelerometer data and/or gyroscope data, according to some implementations.

In some implementations, the motion decomposition module 248 removes anomalies by observing changes in patterns detected from sensor data, such as when the object stops moving or rotating abruptly, as another effect to correct for anomalies. In some implementations, the motion decomposition module 248 analyzes several distinct stored patterns for correcting anomalies in each of the sensors. In some implementations, the motion decomposition module 248 categorizes the type of translational and/or rotational movements of each IMU of the tracked object and outputs the pattern or the category for the motion synthesis module 250. For example, the motion decomposition module 248 deduces that each IMU is in one of many states, including simple linear motion, simple linear motion with rotation, non-linear motion with simple rotation. In some implementations, output from the motion decomposition module 248 additionally controls the learning rate in the dynamic calibration module 246.

In some implementations, the motion synthesis module 250 uses the state information (e.g., constant velocity, constant acceleration, changing acceleration, in combination with rotation) from the motion decomposition module 248 to select one or more algorithms/methodologies. The motion synthesis module 250 subsequently applies the one or more algorithms on the data output from dynamic calibration module 246 to synthesize the motion of the object (sometimes herein referred to as the computation of overall rectified data for the one or more IMUs). For example, if the state information from the motion decomposition module 326 indicates that the object is rotating, the motion synthesis module 250 uses an equation to compute the axis of rotation based on the difference in angular momentum of the IMUs (as indicated by the output of the dynamic calibration module) and the known shape outlined by the predetermined position of the different IMUs. To elaborate on this example, suppose the object is mounted with IMUs in a planar configuration, such as in FIG. 1B, with four sensors, each sensor in a corner. Suppose further that the planar configuration positioned vertically in a diamond shape, with the longitudinal axis passing through the top IMU and the bottom IMU. Now, if the planar (diamond-shaped) object is rotated about the longitudinal axis, the side IMUs on either side of the longitudinal axis will share the same angular momentums but will have different angular momentums as compared to the top IMU and the bottom IMU, and the top IMU will have an angular velocity greater than the bottom IMU that is closer to the axis of rotation. The motion synthesis module 250 computes or synthesizes the rotational axis data from the differences in the angular momentums and the known distances between the sensors, based on the shape formed by the IMUS.

In some implementations, the drift correction module 252 uses Bayes theorem to remove drift by re-conforming sensor positions and orientation to the known (sometimes herein called predetermined) shape. The Bayesian filter predicts how much the IMU data is drifting by. In some implementations, the drift correction module 252 computes the skewness in the data by the motion sensors based on the variation in the norms, distances and angles between the sensors. If the variation in the norms exceeds a threshold, the drift correction module 252 generates a correction matrix (sometimes called a drift matrix) to eliminate drift in successive sensor readings. A shape correcting module (not shown) corrects the data output from the dynamic calibration module (sometimes herein called the clean or filtered data) using the correction matrix, by subtracting the predicted drift from the clean data, in a continuous or iterative fashion, according to some implementations. For example, after every reading of sensor data, previously generated and stored data from the drift correction module 252 is used to correct the clean data output from the noise-filtered, and dynamic calibration module, according to some implementations.

In some implementations, the edge condition handling module 254 handles complex movements (e.g., while spinning along two axes, and moving across on a straight line, say the object also lifts up) and/or transitional movements (e.g., spinning to laterally moving along a straight line) to reduce drift based on the output of the drift correction module 252. In some implementations, the edge condition handling module 254 uses AI to apply probability weightings to compensate for the edge conditions. In some implementations, the edge condition handling module 254 blends a current object common data point (e.g., output by the drift correction module 252) and the previous object common data point (e.g., previous output for a prior sensor reading by the drift correction module 252 that is stored in memory) to remove the edge condition.

Even though in some complex scenarios, drift may not be completely corrected, perpetual drift or constant drift can be eliminated with the aforementioned modules. Furthermore, in some implementations, the drift observed by the combination of the modules described herein is in the order of centimeters or even millimeters, whereas alternate external reference based drift elimination (e.g., using a GPS) could sometimes result in a drift in the order of meters.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 220, optionally, stores a subset of the modules and data structures identified above. Furthermore, memory 220, optionally, stores additional modules and data structures not described above. In some implementations, one or more processing modules and associated data stored in the memory 220 are stored in and executed on a second processing device other than the system with drift-free motion sensors 200 that is configured to receive and process signals produced by the IMUs 214. For example, the second processing device might be a computer system, smart home device or gaming console that executes applications (e.g., computer games) at least some of whose operations are responsive to motion signals provided by the IMUs.

Figure 3:
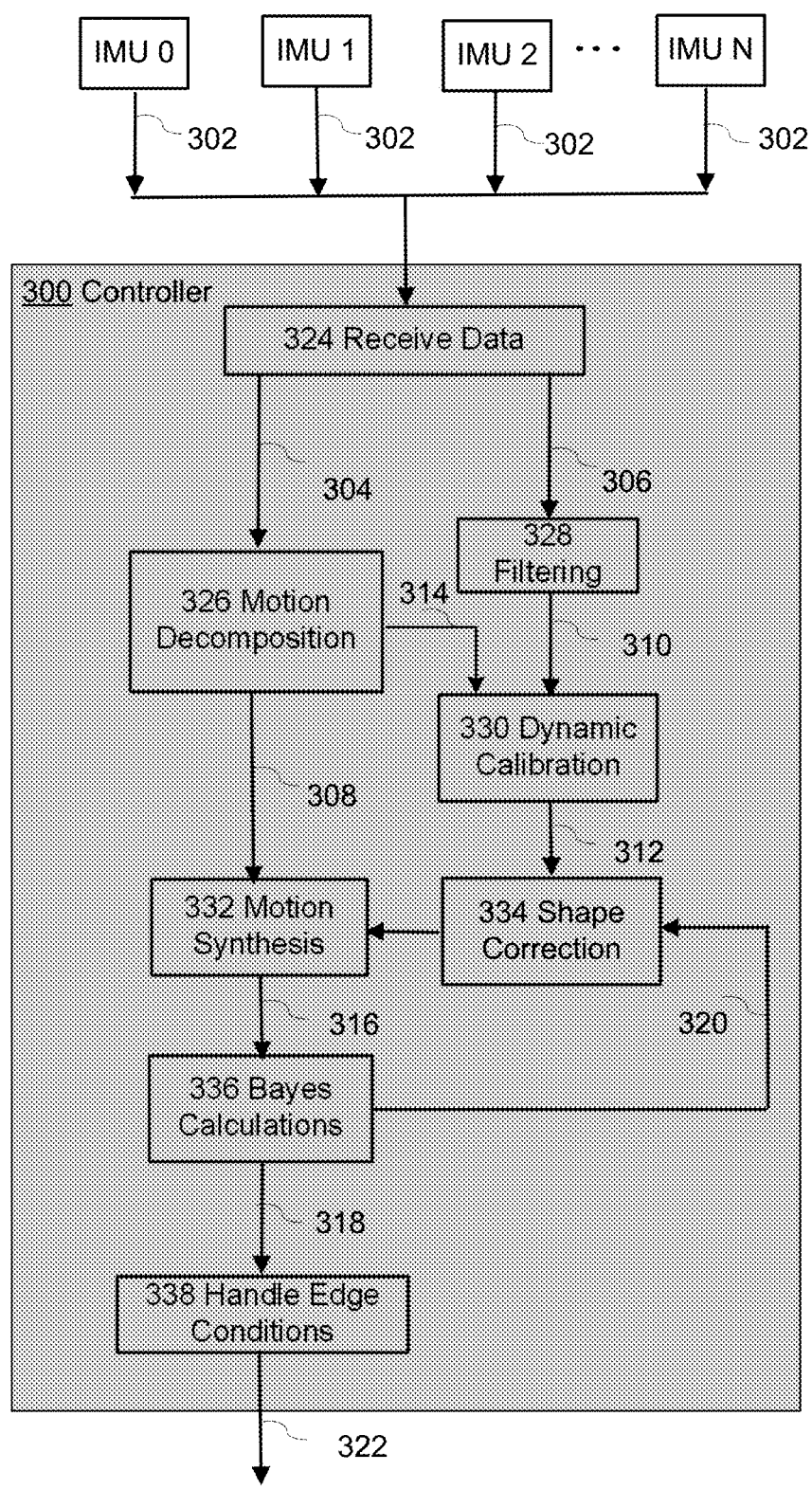
FIG. 3 is a flow diagram illustrating the flow of sensor data through a representative system with drift correction, according to some implementations.

FIG. 3 is a flow diagram illustrating the flow of sensor data through a representative system with drift-free sensor(s), according to some implementations. Raw data (302) from the one or more IMU sensors (IMU 0, IMU 1, IMU 2, . . . , IMU N) is received (324) by the controller 300 (e.g., controller module 240). As previously mentioned, in some implementations, the controller receives the data from the one or more IMUs in parallel (as shown in FIG. 3). The received data is output as raw data (304) to the motion decomposition module 326, according to some implementations. In some implementations, the raw data is also input as data 306 to a filtering module 328 which filters the raw data to produce filtered data 310 which is in turn input to a dynamic calibration module 330. In some implementations, the motion decomposition module 326 also controls (314) the learning rate of the dynamic calibration module 330. In some implementations, the motion decomposition module 326 and/or the dynamic calibration module 330 are optional modules. In such cases, the filtered data 310 is input (not shown) to the motion synthesis module. The motion synthesis module 332, in these cases, does not know the pattern or category of motion but iteratively applies one or more algorithms or equations to synthesize motion. In some implementations, the motion decomposition 326 and the dynamic calibration 330 steps execute asynchronously and/or in parallel. The Bayes calculation step 336 uses the output 316 of the motion synthesis module to generate drift correction matrices 320 (as described previously with reference to FIG. 2) which is consumed by a shape correction module 334 to correct input in the next iteration (i.e., when and after such data becomes available) of motion synthesis. Although not shown in FIG. 3, in some implementations, during a first set of one or more iterations, the shape correction data is not available, and the dynamic calibration output 312 is input to motion synthesis step 332. In some implementations, the output of the Bayes calculation step 336 (318) is input to a step 338 to handle edge conditions (described above in reference to FIG. 2) for complex movements and dynamic learning. The output 322 indicates drift-free real motion output of the controller, according to some implementations.

In some implementations, filtering module 328 includes similar functionality to filtering module 244 in FIG. 2; motion decomposition module 326 includes similar functionality to motion decomposition module 248 in FIG. 2; dynamic calibration module 330 includes similar functionality to dynamic calibration module 246 in FIG. 2; shape correction module 334 includes similar functionality to shape correction module described above in the description for FIG. 2; motion synthesis module 332 includes similar functionality to motion synthesis module 250 in FIG. 2; Bayes calculations module 336 includes similar functionality to drift correction module 252 in FIG. 2; and handle edge conditions module 338 includes similar functionality to edge condition handling module 254 in FIG. 2.

FIGS. 4A-4D illustrate a flowchart representation of a method 400 of tracking position and orientation of an object using a tracking device, according to some implementations. In some implementations, the tracking device includes (402) one or more sides that define a predetermined shape, and a plurality of inertial measurement units (IMU) mounted to the one or more sides of the predetermined shape. Further, each IMU includes a first sub-sensor and a second sub-sensor, and each IMU is positioned at a predetermined distance and orientation relative to a center of mass of the tracking system, according to some implementations. FIGS. 1A-1F described above illustrate various configurations of sensors mounted on 3D objects, according to some implementations. In some implementations (404), the first sub-sensor and the second sub-sensor of the tracking device (e.g., IMUs 204 of FIG. 2) are each one of: accelerometer, magnetometer, gyroscope, altimeter, and pressure sensor and the first sub-sensor is a different sensor type than the second sub-sensor. In some implementations (406), the predetermined shape of the tracking device is one of: a plane, a tetrahedron, and a cube. In some implementations, the tracking device also includes a controller communicatively coupled to the plurality of IMUs. An example system 200 with IMUs 204 was described above in reference to FIG. 2, according to some implementations.

In some implementations, each IMU of the tracking device (408) detects movement of the object and generates inertial output data representing location and/or orientation of the object. For example, IMUs 204 in FIG. 2 or the sensors in FIGS. 1A-1F use a combination of accelerometers, magnetometers, gyroscopes, altimeters, and/or pressure sensors to detect movement of the object and generate data that represents location and/or orientation of the object.

In some implementations, the tracking object, at the controller (410), receives (412) first sub-sensor inertial output data and second sub-sensor inertial output data from each of the plurality of IMUs. For example, the data receiving module 242 of the system 200 receives the output from the one or more IMUs 204 via the communication bus 216. In some implementations, the controller receives (414) the first sub-sensor inertial output data and the second sub-sensor inertial output data from each of the plurality of IMUs periodically at less than approximately 1 ms for continuous high sampling rate.

In some implementations, the controller uses a filtering module (e.g., module 244) to filter (416) the first sub-sensor inertial output data and second sub-sensor inertial output data to minimize signal noise.

Figure 4A:
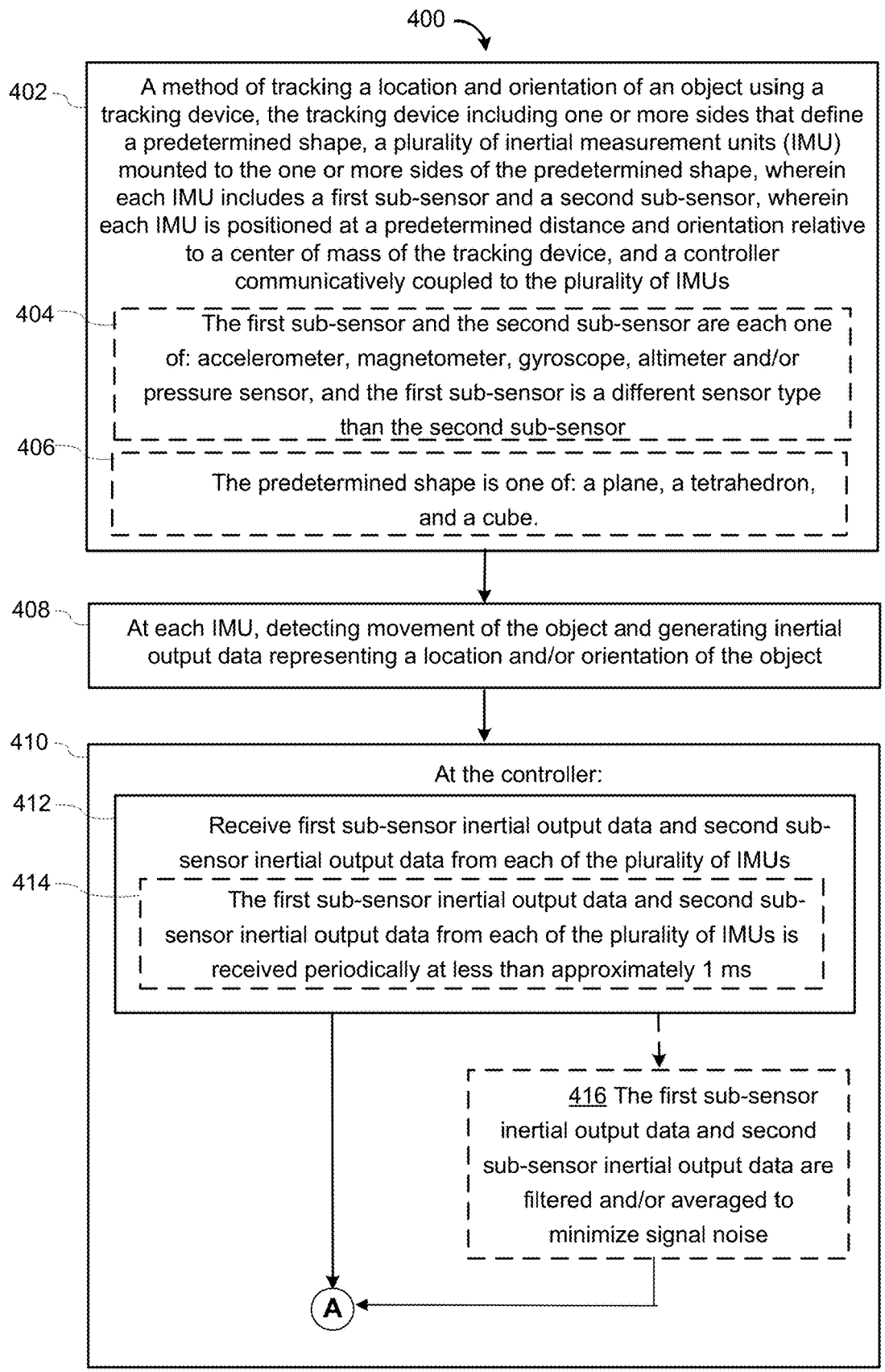
FIGS. 4A-4D illustrate a flowchart representation of a method of tracking position and orientation of an object using a tracking device, according to some implementations.
Figure 4B:
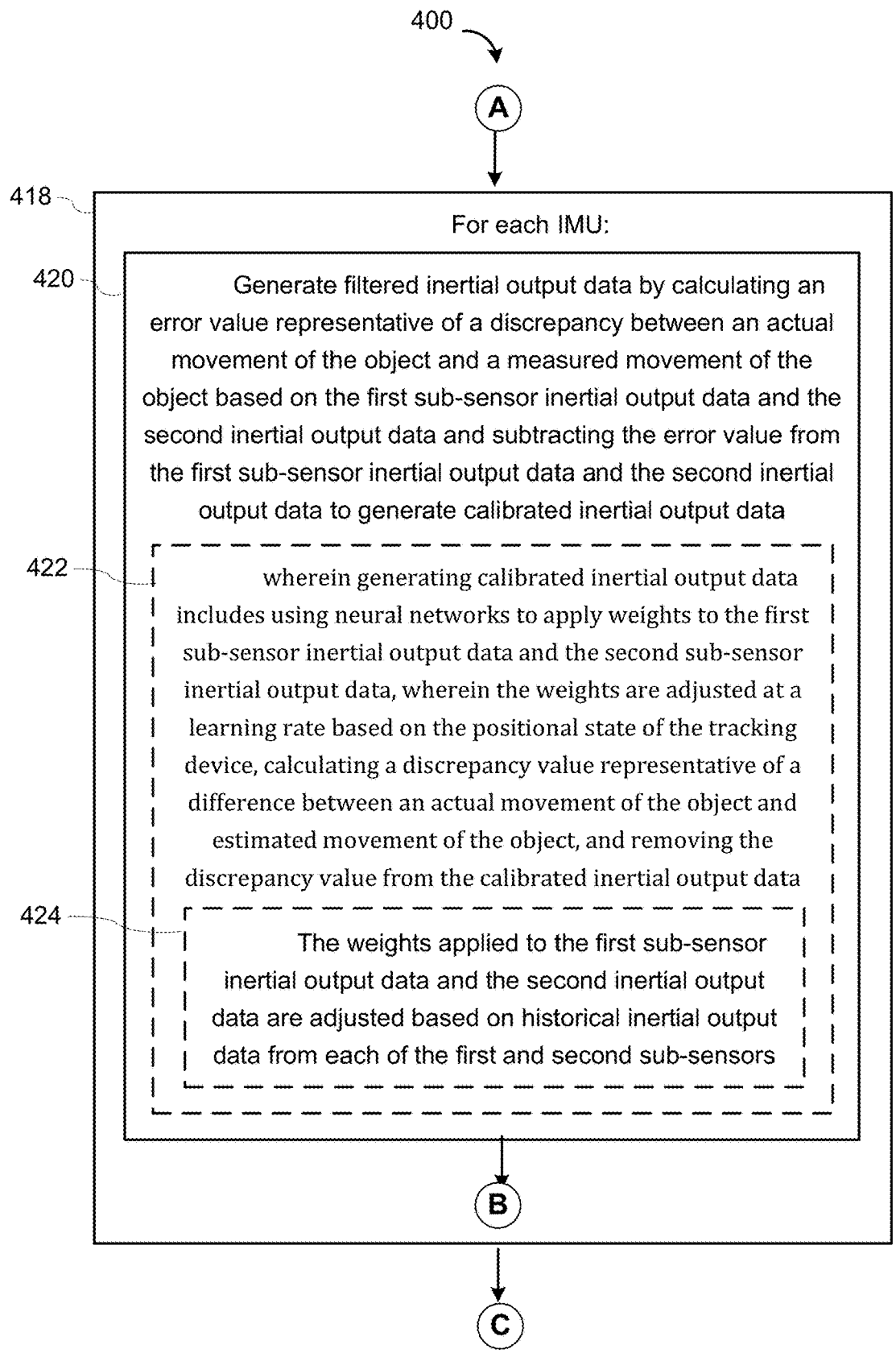

Referring now to FIG. 4B, the controller performs a sequence of steps 418 for each IMU, according to some implementations. In some implementations, the controller generates (420) calibrated inertial output data based on the first sub-sensor inertial output data and the second sub-sensor inertial output data. For example, the controller uses the dynamic calibration module 246 to generate calibrated inertial output data. In some implementations, the controller calculates the error value using (422) neural network weights to evaluate the first sub-sensor inertial output data and the second sub-sensor inertial output data, wherein the weights are adjusted at a learning rate based on the positional state (e.g., stationary position state) of the tracking device, calculating a discrepancy value representative of a difference between an actual movement of the object and estimated movement of the object, and removing the discrepancy value from the calibrated inertial output data, (e.g., using the output of a motion decomposition module, such as module 248). In some implementations, the controller applies (424) neural network weights to the first sub-sensor inertial output data and the second inertial output data based on historical (e.g., prior or previous) inertial output data from each of the first and second sub-sensors. Although not shown, the controller stores and/or accumulates inertial output data received from the IMUs over time that is later retrieved as historical data.

Figure 4C:
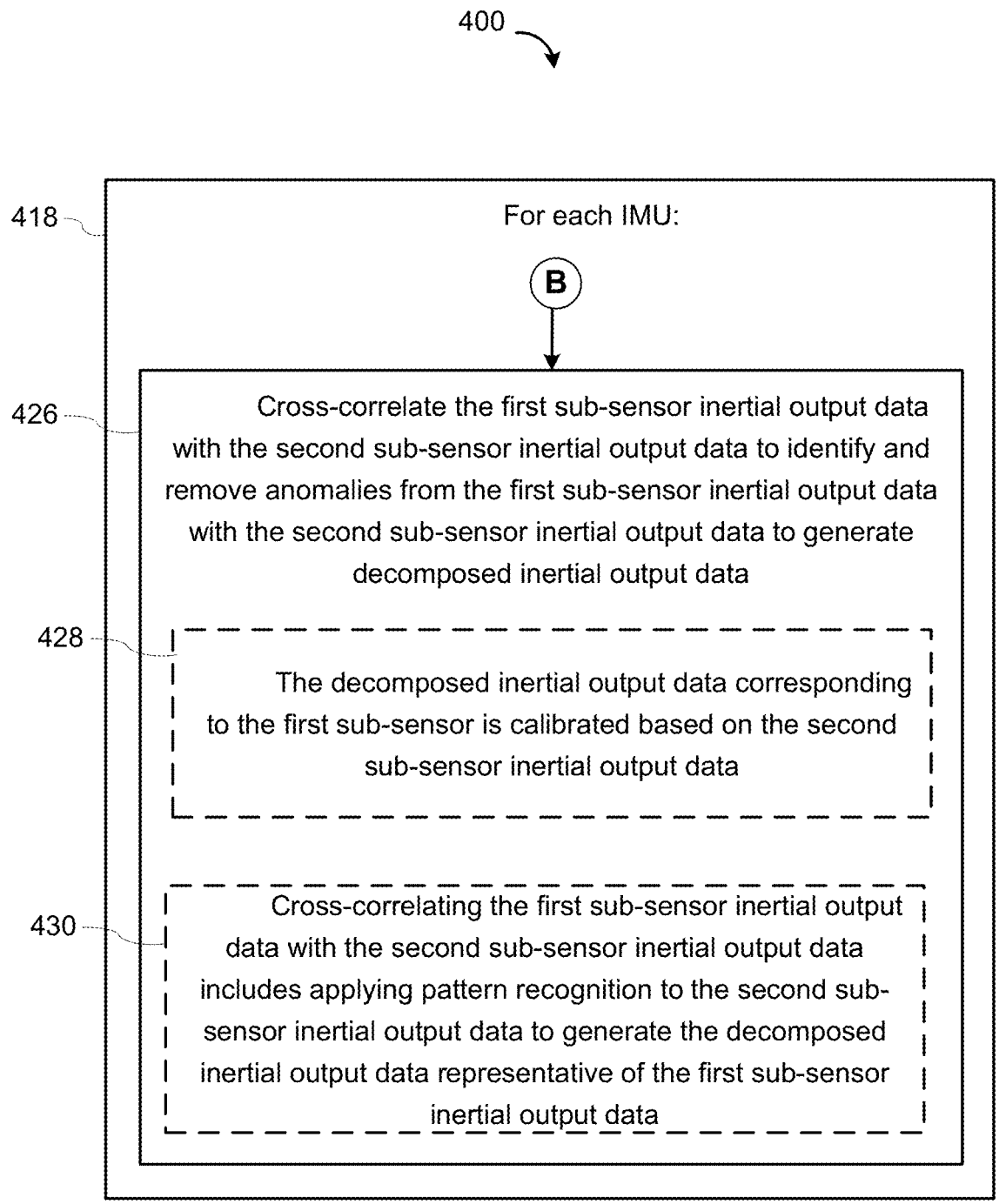

Referring next to FIG. 4C, the controller uses the dynamic calibration module (e.g., module 246) to cross-correlate (426) the first sub-sensor inertial output data with the second sub-sensor inertial output data to identify and remove anomalies from the first sub-sensor inertial output data with the second sub-sensor inertial output data to generate decomposed inertial output data for each IMU, according to some implementations. In some implementations, the controller calibrates (428) the decomposed inertial output data corresponding to the first sub-sensor based on the second sub-sensor inertial output data. In some implementations, the controller cross-correlates the first sub-sensor inertial output data with the second sub-sensor inertial output data by applying (430) pattern recognition (e.g., by using a motion decomposition module, such as module 248) to the second sub-sensor inertial output data to generate the decomposed inertial output data representative of the first sub-sensor inertial output data.

Figure 4D:
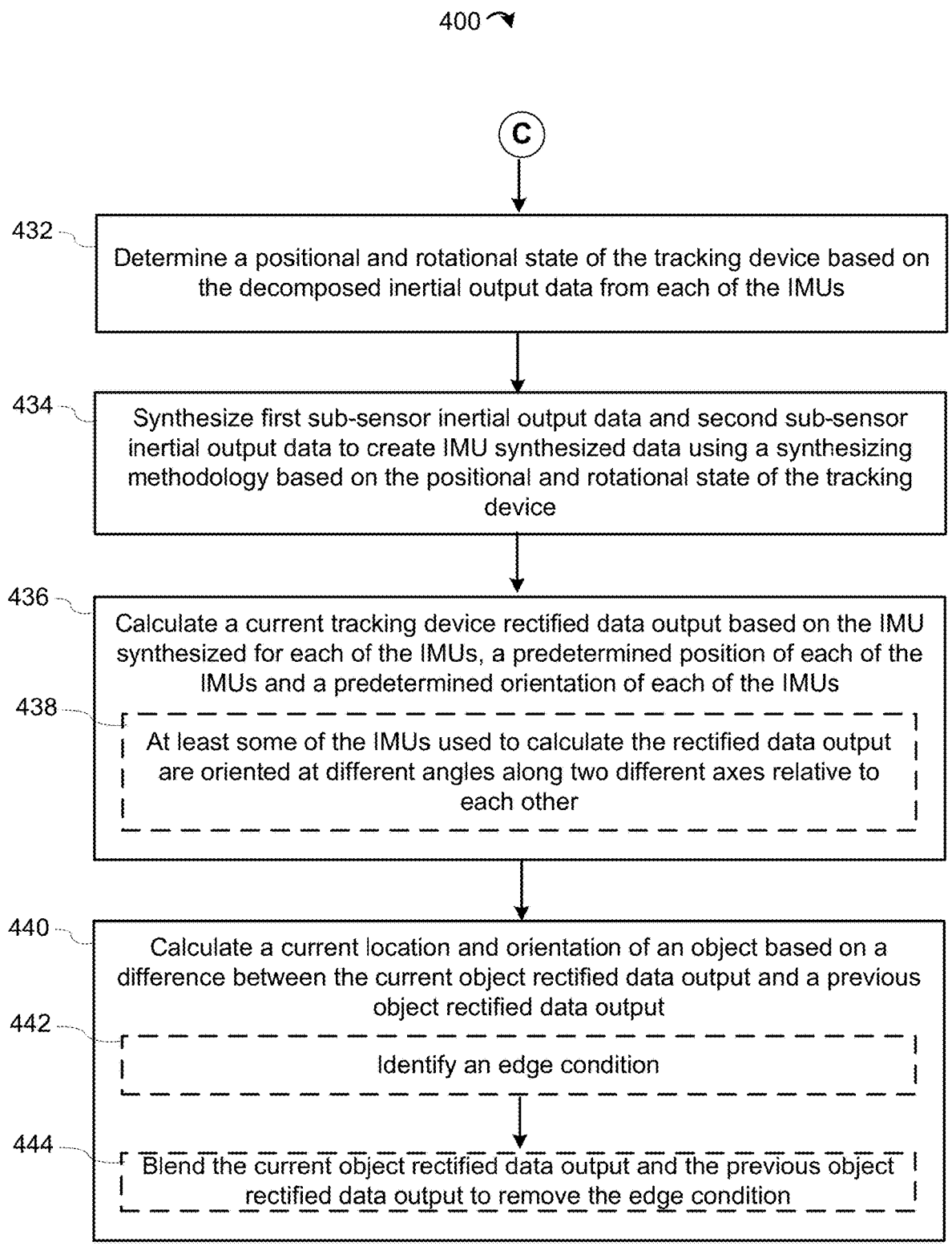

Next, referring to FIG. 4D, the controller determines (432), using a motion decomposition module (e.g., module 248 described above), a positional and rotational state of the tracking device based on the decomposed inertial output data from each of the IMUs, according to some implementations.

Subsequently, the controller synthesizes (434), using a motion synthesis module (e.g., module 250 described above), first sub-sensor inertial output data and second sub-sensor inertial output data to create IMU synthesized data using a synthesizing methodology based on the positional and rotational state of the tracking device, according to some implementations.

In some implementations, the controller calculates (436), using a ACFBT calculation module (not shown), a current tracking device rectified data output based on the data synthesized for each of the IMUs, a predetermined position of each of the IMUs and a predetermined orientation of each of the IMUs to confirm to a predetermined shape. In some implementations (438) of the controller, at least some of the IMUs used to calculate the common data point are oriented at different angles along two different axes relative to each other.

The controller subsequently calculates (440), using a current position and orientation determination module (e.g., module 252 in FIG. 2, or steps 336 and 334 in FIG. 3), a current position and orientation of an object based on a difference between the current object rectified data output and a previous object rectified data output, according to some implementations. In some implementations, the controller identifies (442) an edge condition (e.g., complex movements described above) and blends (444), using an edge condition handling module (e.g., module 254 described above), the current object rectified data output and the previous object rectified data output to remove the edge condition.

It should be understood that the particular order in which the operations in FIGS. 4A-4D have been described is merely an example and is not intended to indicate that the described order is the only order in which the operations could be performed. One of ordinary skill in the art would recognize various ways to reorder the operations described herein.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A tracking device for tracking a location and orientation of an object, the tracking device comprising:
   one or more sides that define a predetermined shape;
   a plurality of inertial measurement units (IMU) mounted to the one or more sides of the predetermined shape, wherein each IMU is configured to detect movement of the object and generate inertial output data representing the location and/or orientation of the object, wherein each IMU includes a first sub-sensor and a second sub-sensor, wherein each IMU is positioned at a predetermined distance and orientation relative to a center of mass of the tracking device;
   a controller communicatively coupled to the plurality of IMUs, the controller configured to perform the steps of:
      receiving first sub-sensor inertial output data and second sub-sensor inertial output data from each of the plurality of IMUs;
      for each IMU:
         generating calibrated inertial output data based on the first sub-sensor inertial output data and the second sub-sensor inertial output data;
         cross-correlating the first sub-sensor inertial output data with the second sub-sensor inertial output data to identify and remove anomalies from the first sub-sensor inertial output data with the second sub-sensor inertial output data to generate decomposed inertial output data;
      determining a positional and rotational state of the tracking device based on the decomposed inertial output data from each of the IMUs;
      synthesizing first sub-sensor inertial output data and second sub-sensor inertial output data to create IMU synthesized data using a synthesizing methodology based on the positional and rotational state of the tracking device;
      calculating a current tracking device rectified data output based on the data synthesized for each of the IMUs, a predetermined position of each of the IMUs and a predetermined orientation of each of the IMUs; and
      calculating a current location and orientation of the object based on a difference between the current tracking device rectified data output and a previous tracking device rectified data output.

2. The tracking device of claim 1, wherein generating calibrated inertial output data includes using neural network weights to evaluate the first sub-sensor inertial output data and the second sub-sensor inertial output data, wherein the weights are adjusted at a learning rate based on the positional state of the tracking device, calculating a discrepancy value representative of a difference between an actual movement of the object and estimated movement of the object, and removing the discrepancy value from the calibrated inertial output data.

3. The tracking device of claim 2, wherein the weights are further adjusted based on historical inertial output data from each of the first and second sub-sensors.

4. The tracking device of claim 1, wherein the decomposed inertial output data corresponding to the first sub-sensor is calibrated based on the second sub-sensor inertial output data.

5. The tracking device of claim 1, wherein cross-correlating the first sub-sensor inertial output data with the second sub-sensor inertial output data includes applying pattern recognition to the second sub-sensor inertial output data to generate the decomposed inertial output data.

6. The tracking device of claim 1, wherein the first sub-sensor inertial output data and the second sub-sensor inertial output data are filtered to minimize signal noise through signal conditioning.

7. The tracking device of claim 1, wherein the first sub-sensor inertial output data and second sub-sensor inertial output data from each of the plurality of IMUs is received periodically at less than approximately 1 ms.

8. The tracking device of claim 1, wherein first sub-sensor and second sub-sensor are each one of: accelerometer, magnetometer, gyroscope, altimeter, and/or pressure sensor; wherein the first sub-sensor is a different sensor type than the second sub-sensor.

9. The tracking device of claim 1, wherein the predetermined shape is one of: a plane, a tetrahedron, and a cube.

10. The tracking device of claim 1, wherein at least some of the IMUs used to calculate the rectified data output are oriented at different angles along two different axes relative to each other.

11. The tracking device of claim 1, wherein calculating the current position and orientation of the object based on the difference between the current tracking device rectified data output and the previous tracking device rectified data output include:
 identifying an edge condition; and
 blending the current tracking device rectified data output and the previous tracking device rectified data output to remove the edge condition.

12. A method of tracking a position and orientation of an object using a tracking device, the tracking device including one or more sides that define a predetermined shape, a plurality of inertial measurement units (IMU) mounted to the one or more sides of the predetermined shape, wherein each IMU includes a first sub-sensor and a second sub-sensor, wherein each IMU is positioned at a predetermined distance and orientation relative to a center of mass of the tracking device, and a controller communicatively coupled to the plurality of IMUs, the method comprising:
 at each IMU, detecting movement of the object and generating inertial output data representing a position and/or orientation of the object;
 at the controller:
  receiving first sub-sensor inertial output data and second sub-sensor inertial output data from each of the plurality of IMUs;
  for each IMU:
   generating calibrated inertial output data based on the first sub-sensor inertial output data and the second sub-sensor inertial output data;
   cross-correlating the first sub-sensor inertial output data with the second sub-sensor inertial output data to identify and remove anomalies from the first sub-sensor inertial output data with the second sub-sensor inertial output data to generate decomposed inertial output data;
  determining a positional and rotational state of the tracking device based on the decomposed inertial output data from each of the IMUs;
  synthesizing first sub-sensor inertial output data and second sub-sensor inertial output data to create IMU synthesized data using a synthesizing methodology based on the positional and rotational state of the tracking device;
  calculating a current tracking device rectified data output based on the IMU synthesized data for each of the IMUs, a predetermined position of each of the IMUs and a predetermined orientation of each of the IMUs; and
  calculating a current location and orientation of the object based on a difference between the current tracking device rectified data output and a previous tracking device rectified data output.

13. The method of claim 12, wherein generating calibrated inertial output data includes using neural networks to apply weights to the first sub-sensor inertial output data and the second sub-sensor inertial output data, wherein the weights are adjusted at a learning rate based on the positional state of the tracking device, calculating a discrepancy value representative of a difference between an actual movement of the object and estimated movement of the object, and removing the discrepancy value from the calibrated inertial output data.

14. The method of claim 13, wherein the weights are further adjusted based on historical inertial output data from each of the first and second sub-sensors.

15. The method of claim 12, wherein the decomposed inertial output data corresponding to the first sub-sensor is calibrated based on the second sub-sensor inertial output data.

16. The method of claim 12, wherein cross-correlating the first sub-sensor inertial output data with the second sub-sensor inertial output data includes applying pattern recognition to the second sub-sensor inertial output data to generate the decomposed inertial output data.

17. The method of claim 12, wherein the first sub-sensor inertial output data and the second sub-sensor inertial output data are filtered to minimize signal noise.

18. The method of claim 12, wherein the first sub-sensor inertial output data and second sub-sensor inertial output data from each of the plurality of IMUs is received periodically at less than approximately 1 ms.

19. The method of claim 12, wherein the first sub-sensor and the second sub-sensor are each one of: accelerometer, magnetometer, gyroscope, altimeter, and/or pressure sensor; wherein the first sub-sensor is a different sensor type than the second sub-sensor.

20. The method of claim 12, wherein the predetermined shape is one of: a plane, a tetrahedron, and a cube.

21. The method of claim 12, wherein at least some of the IMUs used to calculate the rectified data output are oriented at different angles along two different axes relative to each other.

22. The method of claim 12, wherein calculating the current location and orientation of the object based on the difference between the current tracking device rectified data output and the previous tracking device rectified data output include:
 identifying an edge condition; and
 blending the current tracking device rectified data output and the previous tracking device rectified data output to remove the edge condition.

23. A non-transitory computer readable storage medium storing one or more computer programs configured for execution by a computer system including one or more processors, using a tracking device, the tracking device including one or more sides that define a predetermined shape, a plurality of inertial measurement units (IMU) mounted to the one or more sides of the predetermined shape, wherein each IMU includes a first sub-sensor and a second sub-sensor, wherein each IMU is positioned at a predetermined distance and orientation relative to a center of mass of the tracking device, and a controller communicatively coupled to the plurality of IMUs, the one or more computer programs that when executed cause the computer system to perform the method of claim 12.

* * * * *